UNITED STATES PATENT OFFICE.

GEORGE HENRY RICHARDS, OF LONDON, ENGLAND.

NICOTIN SALICYLATE AND PROCESS OF MAKING SAME.

SPECIFICATION forming part of Letters Patent No. 685,059, dated October 22, 1901.

Application filed April 8, 1901. Serial No. 54,793. (No specimens.)

*To all whom it may concern:*

Be it known that I, GEORGE HENRY RICHARDS, merchant, a subject of the King of Great Britain, residing at 128 Southwark street, London, England, have invented a Nicotin Salicylate and the Process of Making the Same for Eradicating Insect Life or Mildew, (for which I have made application for patent in Great Britain, dated November 9, 1900, No. 20,194,) of which the following is a specification.

It has been common in order to eradicate insect life or mildew to employ in horticulture or agriculture compositions or compounds which upon being subjected to heat become vaporized or partly vaporized, and such vapor is the medium by which the objects in view are attained. In some such compositions or compounds one of the factors, and frequently the principal active factor therein, has consisted of nicotin, and in order to supply the nicotin in a convenient and transportable form, and, in fact, in a form which will render it suitable for commercial purposes, the nicotin has been mechanically combined with some substances or absorbents, such as clay or lime, and so formed into a paste, which has rendered it possible to handle and more or less to be suitable, as aforesaid, for commercial purposes. In employing such a manufactured compound the paste is placed in an open-topped receiver, heat is applied below the same, and the volatile constituent—viz., the nicotin—is vaporized and becomes disseminated. When employed in this way, such compositions, as above stated, present disadvantages, a prominent fault and one which is well understood by every user of such compounds being that after all the nicotin (or so much of it as is possible with such a composition) has been vaporized a quantity of residual matter is left behind, which is calculated to corrode the receptacles in which the vaporization has taken place, and this is found to be generally troublesome.

The object of my invention is to produce a new or improved chemical compound containing nicotin, which compound shall be in solid form, capable of being used and commercially sold in the form of a powder or compressed cakes or tablets and shall also be completely volatile at a moderate heat and leave no residual matter.

Now I have found by considerable experimental research that highly-purified nicotin can be combined with salicylic acid, as hereafter described, to form a solid crystalline salt, and that this salt is entirely dissipated by heat and is extremely suitable for vaporizing compounds by reason of the insecticide property of nicotin and the germicide property of salicylic acid, while no residue is left in the receptacle in which the vaporization is carried out.

My present invention therefore consists of a novel compound or composition for use in horticulture or agriculture for destroying insect life and mildew, together with the process of manufacture thereof, the compound consisting, primarily, of a salt of nicotin obtained by combining nicotin with salicylic acid to produce a solid salt, which may be reduced to powder, and the composition may be sold and used in this form. I have, however, in some cases found it advantageous to compress or otherwise bring the substance into a more compact form, such as into cakes or tablets.

My compound is manufactured substantially as follows, the proportions given being approximate: About forty-two pounds of salicylic acid is added to about fifty pounds of nicotin, preferably highly-purified nicotin, the acid being dissolved in the nicotin by means of heat. The mixture is then set aside to crystallize, after which the mother-liquor is drained off and the salicylate of nicotin is dried and powdered. I then generally compress the solid salt thus produced into cakes or tablets, each cake or tablet containing a sufficient quantity of the salt suitable when vaporized to properly fumigate, say, a glasshouse of a known cubical space.

When my improved compound is placed into a dish or receiver and heat is applied, the entire mass melts and volatilizes, and no residue is left in the dish, while the solid form of the compound renders it, as before stated, particularly advantageous for sale, transport, and packing.

What I claim as my invention, and desire to secure by Letters Patent, is—

1. As a new article of manufacture, a compound in solid form for use in horticulture or agriculture, for eradicating insect life or mildew, the said compound consisting of nicotin and salicylic acid forming a solid salt which is capable of being entirely volatilized by heat, substantially as set forth.

2. The process for preparing the wholly-volatilizable solid compound for use in horticulture or agriculture, for eradicating insect life or mildew, consisting in adding a proportion of about forty-two pounds of salicylic acid to about fifty pounds of nicotin, dissolving the acid in the nicotin by the application of heat, then allowing the liquid to crystallize, draining off the mother-liquor, and finally drying and powdering the resulting product, substantially as set forth.

GEORGE HENRY RICHARDS.

Witnesses:
GRIFFITH BREWER,
W. W. MARSHALL.